United States Patent
Qiao et al.

(10) Patent No.: US 12,127,132 B2
(45) Date of Patent: Oct. 22, 2024

(54) UPLINK POWER CONTROL METHOD AND APPARATUS APPLICABLE TO NON-TERRESTRIAL NETWORK

(71) Applicant: HUAWEI TECHNOLOGIES CO., LTD., Guangdong (CN)

(72) Inventors: Yunfei Qiao, Hangzhou (CN); Yinggang Du, Shenzhen (CN); Chenlei Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 17/673,539

(22) Filed: Feb. 16, 2022

(65) Prior Publication Data
US 2022/0174610 A1    Jun. 2, 2022

Related U.S. Application Data

(63) Continuation of application No. PCT/CN2020/107640, filed on Aug. 7, 2020.

(30) Foreign Application Priority Data

Aug. 16, 2019 (CN) .......................... 201910758377.6

(51) Int. Cl.
*H04B 7/00* (2006.01)
*H04W 52/14* (2009.01)
(Continued)

(52) U.S. Cl.
CPC ....... *H04W 52/146* (2013.01); *H04W 52/283* (2013.01); *H04W 84/06* (2013.01)

(58) Field of Classification Search
CPC . H04W 52/146; H04W 52/283; H04W 52/18; H04W 52/221; H04W 52/226; H04W 52/383
See application file for complete search history.

(56) References Cited

U.S. PATENT DOCUMENTS

| 5,267,262 A | 11/1993 | Wheatley, III |
| 9,661,589 B2 * | 5/2017 | Ouchi ................. H04W 52/362 |

(Continued)

FOREIGN PATENT DOCUMENTS

| CN | 1259243 A | 7/2000 |
| CN | 1276110 A | 12/2000 |

(Continued)

OTHER PUBLICATIONS

Office Action issued in Chinese Application No. 201910758377.6 on May 11, 2022, 7 pages (with English translation).

(Continued)

*Primary Examiner* — Tuan Pham
(74) *Attorney, Agent, or Firm* — Fish & Richardson P.C.

(57) ABSTRACT

This application discloses example uplink power control methods and example apparatuses. One example uplink power control method includes receiving, by a terminal device, uplink power control information, wherein the uplink power control information comprises power adjustment information, and the power adjustment information is used to compensate for a power deviation caused by a transmission delay of a satellite communication link. The terminal device can then determine uplink transmit power based on the uplink power control information. An uplink signal can then be sent based on the uplink transmit power.

18 Claims, 6 Drawing Sheets

(51) Int. Cl.
H04W 52/28 (2009.01)
H04W 84/06 (2009.01)

(56) References Cited

U.S. PATENT DOCUMENTS

| 10,939,437 B2* | 3/2021 | Kusashima ....... H04W 72/0453 |
| 10,945,214 B2* | 3/2021 | Chen .................. H04W 52/146 |
| 2015/0126239 A1 | 5/2015 | Kim et al. |
| 2018/0324606 A1 | 11/2018 | Buer et al. |

FOREIGN PATENT DOCUMENTS

| CN | 103220763 A | 7/2013 |
| CN | 105307254 A | 2/2016 |
| CN | 107333241 A | 11/2017 |
| CN | 109862611 A | 6/2019 |
| WO | 2018222347 A1 | 12/2018 |

OTHER PUBLICATIONS

Office Action issued in Chinese Application No. 201910758377.6 on Oct. 26, 2021, 13 pages (with English translation).

\* cited by examiner

UPLINK POWER CONTROL METHOD AND APPARATUS APPLICABLE TO NON-TERRESTRIAL NETWORK

CROSS-REFERENCE TO RELATED APPLICATIONS

This application is a continuation of International Application No. PCT/CN2020/107640, filed on Aug. 7, 2020, which claims priority to Chinese Patent Application No. 201910758377.6, filed on Aug. 16, 2019. The disclosures of the aforementioned applications are hereby incorporated by reference in their entireties.

TECHNICAL FIELD

This application relates to the field of satellite communication, and more specifically, to an uplink power control method and an apparatus that are applicable to a non-terrestrial network.

BACKGROUND

Non-terrestrial network (Non-Terrestrial Network, NTN) communication, especially satellite communication, is included in discussion of related 3GPP specifications due to features such as wide coverage and a strong disaster resistance capability. An NTN can cover a specific application scenario together with a terrestrial network and serve as an enhancement means for terrestrial network coverage, and can independently provide services for an isolated island, a remote area (such as poles and oceans), aerospace equipment, and the like, and can also directly provide a broadcast or multicast service for a network edge or user equipment, so that scalability of a 5G network is significantly improved. As one of the important implementation forms of the NTN, satellite communication is an important constituent part of a space-ground integrated network. At present, both the academic community and the industrial community focus on a satellite-ground integrated communication scenario, to seamlessly connect the non-terrestrial network to terrestrial communication, so that real global coverage and global roaming are implemented.

Power control means that when an indicator such as received signal strength or a signal-to-noise ratio is evaluated, transmit power is changed in due time to compensate for a path loss and fading on a radio channel, so that communication quality is maintained without causing additional interference to another user on a same radio resource. In addition, power control enables transmit power of a transmitter to be effectively controlled, so that power consumption is effectively reduced. In an NTN scenario, because a transmission delay from a satellite to a terminal device is relatively large, when the terminal device (User Equipment, UE) receives a power control indication delivered by the satellite, it is usually quite difficult for actually required transmit power to meet an actual requirement, and therefore, an existing power control mechanism urgently needs to be updated.

SUMMARY

This application provides an uplink power control method and an apparatus that are applicable to a non-terrestrial network, to meet a requirement of a ground terminal device for transmit power in a satellite communication scenario. In consideration of impact caused by a relatively large transmission delay of a satellite link, uplink power control information received by the terminal device is enabled to match an actual requirement. The following describes summary of this application from a plurality of aspects. It is easy to understand that the plurality of aspects and a plurality of implementations below may be mutually referenced.

According to a first aspect, this application provides an uplink power control method, and the method includes: A terminal device receives uplink power control information, where the uplink power control information includes power adjustment information, and the power adjustment information is used to compensate for a power deviation caused by a transmission delay of a satellite communication link; and the terminal device determines uplink transmit power based on the uplink power control information, and sends an uplink signal based on the uplink transmit power.

According to a second aspect, this application provides an uplink power control method, and the method includes: A satellite determines power adjustment information based on a power adjustment influencing factor, where the power adjustment information is used to compensate for a power deviation caused by a transmission delay of a satellite communication link, and the power adjustment influencing factor includes at least one of the following: relative locations of a terminal device and the satellite, an uplink timing adjustment value, and an identifier of a satellite serving cell; and the satellite sends uplink power control information, where the uplink power control information includes the power adjustment information.

According to a third aspect, this application provides a satellite communication apparatus, and the apparatus includes: a receiving unit, configured to receive uplink power control information, where the uplink power control information includes power adjustment information, and the power adjustment information is used to compensate for a power deviation caused by a transmission delay of a satellite communication link; and a processing unit, configured to: determine uplink transmit power based on the uplink power control information, and send an uplink signal based on the uplink transmit power.

According to a fourth aspect, this application provides a satellite communication apparatus, and the apparatus includes: a processing unit, configured to determine power adjustment information based on a power adjustment influencing factor, where the power adjustment information is used to compensate for a power deviation caused by a transmission delay of a satellite communication link, and the power adjustment influencing factor includes at least one of the following: relative locations of a terminal device and a satellite, an uplink timing adjustment value, and an identifier of a satellite serving cell; and a sending unit, configured to send uplink power control information, where the uplink power control information includes the power adjustment information.

In some implementations of the first aspect or the third aspect, the power adjustment information is determined based on at least one of the following factors: relative locations of the terminal device and a satellite, an uplink timing adjustment value, and an identifier of a satellite serving cell.

In some implementations of the second aspect, after the satellite sends the uplink power control information, the method further includes: The satellite sends updated uplink power control information based on time indicated by a timer; or the satellite monitors relative locations of the terminal device and the satellite, and sends updated uplink power control information if the relative locations of the terminal device and the satellite meet a preset threshold condition.

In some implementations of the first aspect, the second aspect, the third aspect, or the fourth aspect, the power adjustment information includes at least one of the following: a power adjustment change rate and a power compensation factor. The power adjustment change rate is used to determine a change rate of compensation power in a preset time interval, and the power compensation factor is a variable coefficient used to compensate for the power deviation caused by the transmission delay of the satellite communication link.

In some implementations of the first aspect, the second aspect, the third aspect, or the fourth aspect, the power adjustment information includes a first indication index, and the first indication index is used to indicate the power adjustment change rate and/or the power compensation factor.

In some implementations of the first aspect, the second aspect, the third aspect, or the fourth aspect, the power adjustment information includes a power adjustment update factor, and the terminal device updates the power adjustment change rate and/or the power compensation factor based on historical power adjustment information and the power adjustment update factor.

In some implementations of the first aspect, the second aspect, the third aspect, or the fourth aspect, the power adjustment change rate is determined based on a change rate of a distance between the terminal device and the satellite.

In some implementations of the fourth aspect, the apparatus further includes: a monitoring unit, configured to monitor time indicated by a timer, so that the satellite communication apparatus sends updated uplink power control information; or configured to: monitor the relative locations of the terminal device and the satellite, and enable the satellite communication apparatus to send updated uplink power control information if the relative locations of the terminal device and the satellite meet a preset threshold condition.

According to a fifth aspect, this application provides a communication apparatus, where the apparatus includes a processor and a memory, the processor and the memory are electrically coupled, the memory is configured to store computer-readable instructions or a computer program, and the processor is configured to read the computer-readable instructions or the computer program to implement the power control method according to any one of the foregoing aspects and the implementations thereof.

According to a sixth aspect, this application provides a computer-readable storage medium, where the computer-readable storage medium includes computer program instructions, and when the computer program instructions are run on a computer, the power control method according to any one of the foregoing aspects and the implementations thereof is implemented.

According to a seventh aspect, this application provides a computer program product, and when the computer program product is run on a computer, the computer is enabled to perform the power control method according to any one of the foregoing aspects and the implementations thereof.

According to an eighth aspect, this application provides a computer program, and when the computer program product is run by a computer, the power control method according to any one of the foregoing aspects and the implementations thereof is performed.

In the embodiments of this application, the satellite communication apparatus first determines the power adjustment information based on the power adjustment influencing factor, where the power adjustment information is used to compensate for the power deviation caused by the transmission delay of the satellite communication link, and the power adjustment influencing factor includes at least one of the following: the relative locations of the terminal device and the satellite, the uplink timing adjustment value, and the identifier of the satellite serving cell; and then sends the uplink power control information that includes the power adjustment information to the ground terminal device. In another aspect, a terrestrial communication apparatus receives the uplink power control information that includes the power adjustment information, and then determines uplink transmit power based on the uplink power control information, and transmits a signal based on the uplink transmit power. Technical solutions in this application are featured by strong actionability and a simple procedure. An existing mechanism is adjusted based on a feature of a satellite link to meet an actual transmit power requirement of the terminal device in this scenario.

BRIEF DESCRIPTION OF DRAWINGS

The following describes accompanying drawings used in embodiments of this application.

DESCRIPTION OF EMBODIMENTS

The following describes technical solutions in embodiments of this application with reference to accompanying drawings in the embodiments of this application. In descriptions of the embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of the embodiments of this application, the terms "first" and "second" are merely intended for description, and shall not be understood as an indication or implication of relative importance or implicit indication of a quantity of indicated technical features. Therefore, a feature limited by "first", "second", or the like may explicitly or implicitly include one or more features. In the descriptions of the embodiments of this application, unless otherwise specified, "a plurality of" means two or more.

The terms such as "component", "module", and "system" used in this application are used to indicate computer-related entities, hardware, firmware, a combination of hardware and software, software, or software being executed. For example, the component may be but is not limited to a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. The components may perform communication by using a local and/or remote process and based on, for example, a signal having one or more data packets (for example, data from two components interacting with another component in a local system, a distributed system, and/or across a network such as the internet interacting with other systems by using the signal). It should be noted that sequence numbers of steps in the method embodiments of this application have only a function of identifying steps in the method, and do not limit a sequence between the steps with the sequence numbers.

Figure 1:
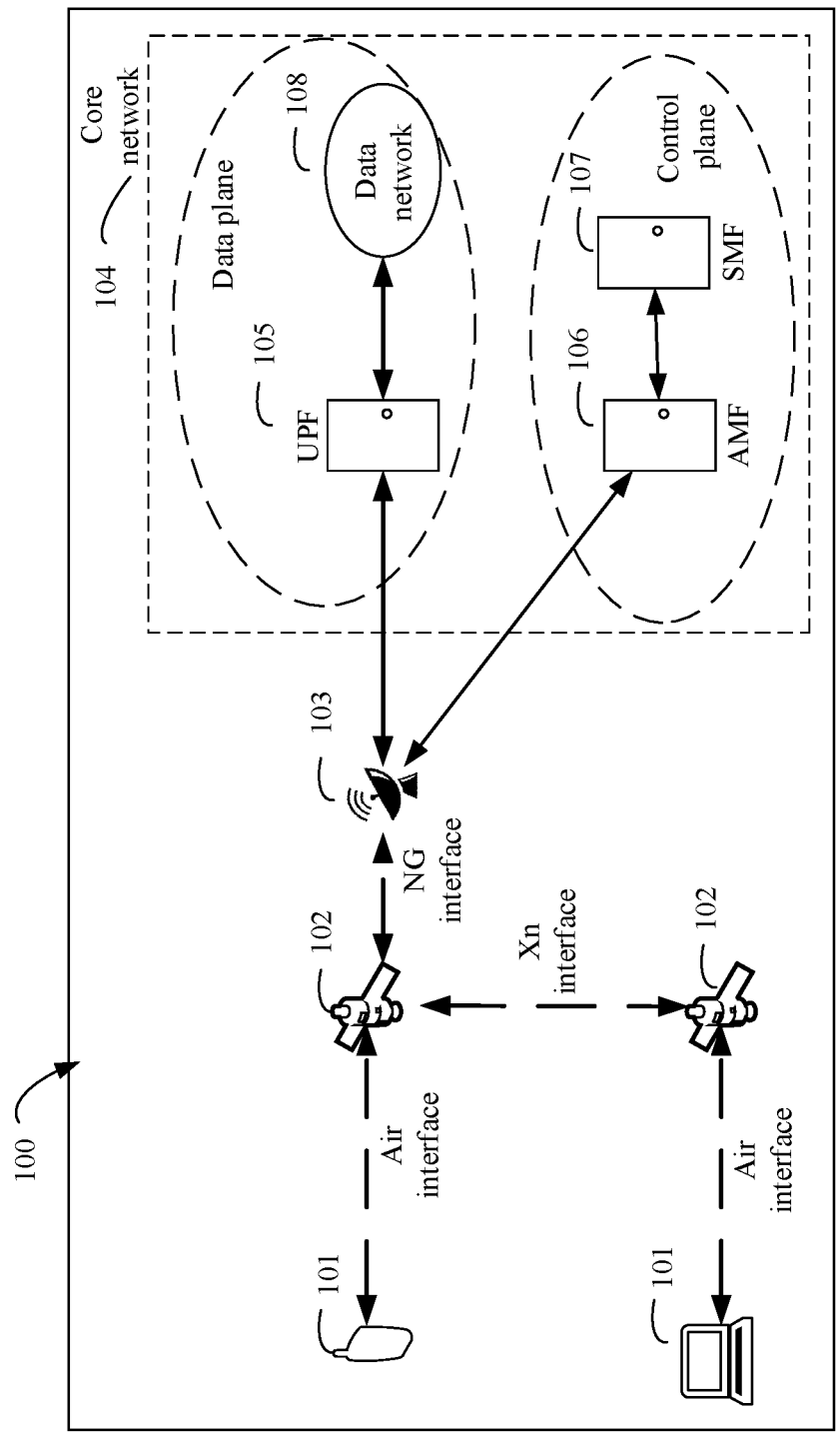
FIG. 1 is a schematic diagram of a typical network architecture of a satellite communication system.

To better understand a network architecture and a communication method for coordinated satellite communication disclosed in the embodiments of this application, an application scenario of the embodiments of this application is first described. Refer to FIG. 1. A typical network architecture of a satellite communication system is first used as an example for description, and a network architecture for actual satellite communication is similar to this.

FIG. 1 is a schematic diagram of a typical network architecture of a satellite communication system. As shown in FIG. 1, a satellite communication system 100 includes a terminal device 101, a satellite base station (or referred to as a satellite or a communication satellite) 102, a ground station 103, and a core network 104 (the core network 104 mainly includes a user plane function (UPF) unit 105, an access and mobility management function (AMF) unit 106, a session management function (SMF) unit 107, and a data network 108). The terminal device 101 accesses a network through an air interface, to communicate with the satellite base station 102. The satellite base station 102 is connected to the ground core network 104 through a radio link (an NG interface). In addition, there is also a radio link between satellite base stations 102, and signaling exchange and user data transmission between the satellite base stations are completed through an Xn interface. The network elements and the interfaces shown in FIG. 1 are described as follows.

In this application, the terminal device 101 may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device 101 may access a satellite network through an air interface and initiate a service such as a call or going online on the internet, and may be a mobile device that supports 5G new radio (NR, new radio). Typically, the terminal device 101 may be a mobile phone, a tablet computer, a portable notebook computer, a virtual/mixed/augmented reality device, a navigation device, a ground base station (for example, an eNB or a gNB), a ground station (ground station, GS), a session initiation protocol (Session Initiation Protocol, SIP) phone, a wireless local loop (Wireless Local Loop, WLL) station, a personal digital assistant (Personal Digital Assistant, PDA), a handheld device with a satellite communication function, a computing device, another processing device connected to a wireless modem, a vehicle-mounted device, a wearable device, a terminal device in a 5G network, a terminal device in a future evolved public land mobile communication network (Public Land Mobile Network, PLMN) or another future communication system, or the like.

The satellite base station 102 mainly provides a radio access service for the terminal device 101, schedules a radio resource for the terminal device accessing the satellite base station, and provides a reliable radio transmission protocol, a data encryption protocol, and the like. The satellite base station is an artificial earth satellite, a high altitude aircraft, or the like that is used as a wireless communication base station, for example, an evolved base station (eNB) and a 5G base station (gNB). The satellite base station may be a geostationary earth orbit (geostationary earth orbit, GEO) satellite, may be a non-geostationary earth orbit (none-geostationary earth orbit, NGEO) such as a medium earth orbit (medium earth orbit, MEO) satellite or a low earth orbit (low earth orbit, LEO) satellite, may be a high altitude platform station (High Altitude Platform Station, HAPS), or the like.

In this embodiment of this application, the ground station (ground station) 103 is mainly responsible for forwarding signaling and service data between the satellite base station 102 and the core network 104. The ground station is usually a ground device that is disposed on the surface of the earth (including being disposed on a ship or an airplane) to perform artificial satellite communication. The ground station mainly includes a high-gain antenna system that can trace an artificial satellite, a high-power microwave transmission system, a low-noise receiving system, a power supply system, and the like.

The core network (core network) 104 is mainly used for user access control, charging, mobility management, session management, user security authentication, a supplementary service, and the like. The core network 104 mainly includes the user plane function unit 105, the access and mobility management function unit 106, the session management function unit 107, and the data network 108. The core network 204 includes a plurality of function units that may be classified as control plane function entities and data plane function entities. The access and mobility management function (AMF, Access and mobility function) unit 106 is a control plane function entity, and is responsible for user access management, security authentication, and mobility management. The session management function (SMF, Session Management Function) unit 107 is a control plane function entity, is responsible for session management, and is connected to the AMF. The user plane function (UPF, User Plane Function) unit 105 is a data plane function entity, and is responsible for functions such as user plane data transmission management, traffic statistics collection, and lawful interception. The data network 108 is a data plane function entity, and is connected to the UPF. The core network further includes other function units, but the function units are not listed one by one.

User equipment and the satellite base station may implement wireless communication based on air interface technologies such as 5th generation mobile communication system new radio (5G NR, 5th generation mobile networks new radio), long term evolution (LTE, long term evolution), a global system for mobile communication (GSM, global system for mobile communication), and a universal mobile telecommunication system (UMTS, universal mobile telecommunication system). The Xn interface is an interface between the satellite base stations, and is mainly used for signaling exchange such as handover. The NG interface is an interface between the satellite base station and the ground station (the core network), and is mainly used to exchange signaling such as NAS signaling of the core network, and user service data.

In a current NR protocol, uplink power control mainly includes an open-loop power control part, a closed-loop power control part, and another adjustment value part. In addition, to ensure that a power capability of the terminal device is matched, the terminal device configures maximum output power Pcmax. Generally, a calculation formula for uplink power control P may be expressed as follows:

$$P = \min\left\{ \begin{array}{l} Pcmax, \\ \text{Open-loop running point} + \text{Closed-loop offset} + \text{Another adjustment value} \end{array} \right\} \quad (1.1)$$

The open-loop running point represents a value of the open-loop power control part, the closed-loop offset represents a value of the closed-loop power control part, and another adjustment value is a value of the another adjustment value part other than open/closed-loop power control.

In a 5G-NR system, a service needs to be transmitted based on scheduling of a base station. A specific scheduling procedure is that the base station sends a control channel such as a PDCCH. The control channel may carry scheduling information in different DCI formats that is used to schedule a PDSCH or a PUSCH. The scheduling information may include control information such as resource allocation information and a modulation and coding scheme. The terminal device detects the control channel in a subframe, and performs downlink data channel receiving or uplink data channel sending based on the scheduling information carried on the detected control channel.

Scheduling information UL DCI of the control channel PDCCH indicates sending of uplink data PUSCH, and the DCI carries a TPC command word $\delta_{PUSCH}$ of the PUSCH. Scheduling information DL DCI of the control channel PDCCH indicates receiving of downlink data PDSCH, and the DL DCI carries a TPC command word $\delta_{PUCCH}$ of a PUCCH.

Transmit power of an uplink shared channel (PUSCH) is determined by using the following formula:

$$P_{PUSCH,f,c}(i, j, q_d, l) = \min\left\{ \begin{array}{l} P_{CMAX,f,c}(i), \\ P_{O\_PUSCH,f,c}(j) + 10\log_{10}(2^\mu \cdot M_{RB,f,c}^{PUSCH}(i)) + \alpha_{f,c}(j) \cdot PL_{f,c}(q_d) + \Delta_{TF,f,c}(i) + f_{f,c}(i, l) \end{array} \right\} \quad (1.2)$$

f represents a used carrier frequency band, c represents a serving cell identifier, i represents a transmission cycle of the PUSCH, j represents a configured parameter, and l represents a power control adjustment status index.

$P_{CMAX,f,c}(i)$ represents maximum power that the terminal device (UE) allows to transmit on a carrier and a serving cell.

$P_{O\_PUSCH,f,c}(j)$ represents initial power (this parameter includes a cell-level higher layer configuration parameter and a UE-level higher layer configuration parameter) of the physical uplink shared channel (PUSCH).

$M_{RB,f,c}^{PUSCH}(i)$ represents resource allocation bandwidth indication information of the PUSCH.

$\alpha_{f,c}(j)=1$ represents a path loss compensation factor.

$PL_{f,c}(q_d)$ represents a path loss estimate.

$\Delta_{TF,f,c}(i)$ represents an offset of a modulation scheme, for example, $\Delta_{TF,f,c}(i)=10 \log_{10} ((2^{BPRE \cdot K_s}-1) \cdot \beta_{offset}^{PUSCH})$, which is used to control power for transmitting information on the PUSCH.

$f_{f,c}(i, 1)$ represents an adjustment parameter for closed-loop power control of the PUSCH, where $f_{f,c}(i, 1)=f_{f,c}(i-1, 1)+\delta_{PUSCH, f,c}(i-K_{PUSCH}, 1)$.

A transmission delay of a satellite communication link is relatively large. When a ground terminal device receives an indication that is delivered by a satellite and that is for power control, there is a deviation between an actually required adjustment value of uplink power control and an adjustment value indicated by the indication that is received by the terminal device. Through the foregoing analysis, it is found that, in an existing NR protocol, if an uplink power control method is directly migrated to satellite communication, a case in which required power does not match indicated power is caused, and high-quality communication cannot be implemented. Therefore, the uplink power control method needs to be improved to adapt to a feature of a high delay of the satellite communication link, and compensate for a problem of a transmit power adjustment value deviation caused by a large transmission delay.

A physical random access channel (Physical Random Access Channel, PRACH) is an access channel on which the terminal device (UE) starts to initiate a call. Initial transmit power $P_{prach,target}$ of the terminal device is configured in a preamble signal of the PRACH, and a path loss compensation factor is fixed to 1. If the PRACH is transmitted based on initially configured transmit power, and the terminal device does not receive a random access response (RAR), the terminal device may choose to increase the transmit power until the PRACH receives the RAR or the transmit power reaches maximum output power $P_{cmax}$ configured by the terminal device. After establishing a connection to a network side, the terminal device may perform power control on the physical uplink shared channel (PUSCH) based on a technical method provided in this application.

Figure 2:
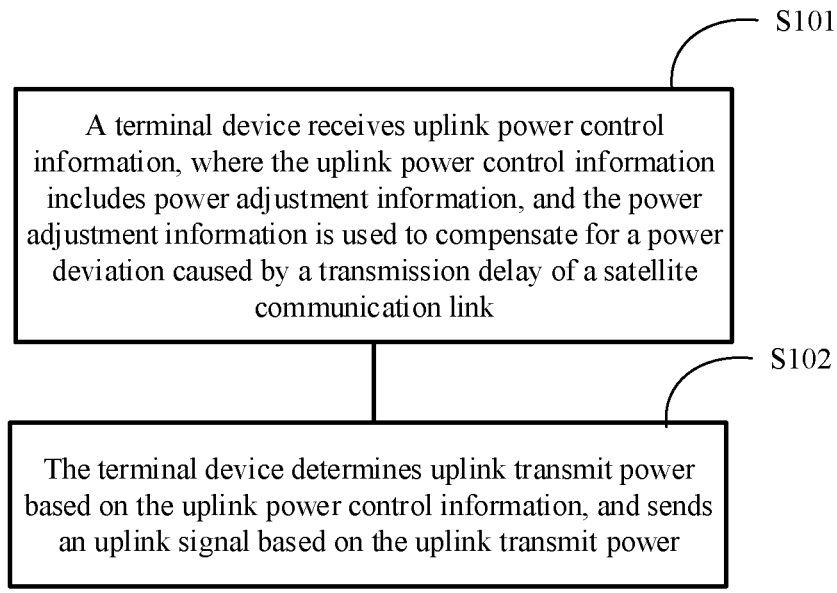
FIG. 2 is a flowchart of an uplink power control method according to an embodiment of this application.

FIG. 2 is a flowchart of an uplink power control method according to an embodiment of this application. The method is applicable to a ground terminal device, and the method includes the following steps:

S101: The terminal device receives uplink power control information, where the uplink power control information includes power adjustment information, and the power adjustment information is used to compensate for a power deviation caused by a transmission delay of a satellite communication link.

S102: The terminal device determines uplink transmit power based on the uplink power control information, and sends an uplink signal based on the uplink transmit power.

Specifically, the power adjustment information is determined based on at least one of the following factors: relative locations of the terminal device and a satellite, an uplink timing adjustment value, and an identifier of a satellite serving cell.

Specifically, the power adjustment information includes at least one of the following: a power adjustment change rate and a power compensation factor. The power adjustment change rate is used to determine a change rate of compensation power in a preset time interval, and the power compensation factor is a variable coefficient used to compensate for the power deviation caused by the transmission delay of the satellite communication link.

Optionally, the power adjustment information includes a first indication index, and the first indication index is used to indicate the power adjustment change rate and/or the power compensation factor.

Optionally, the power adjustment information includes a power adjustment update factor, and the terminal device updates the power adjustment change rate and/or the power compensation factor based on historical power adjustment information and the power adjustment update factor.

Optionally, the power adjustment change rate is determined based on a change rate of a distance between the terminal device and the satellite.

Corresponding to an operation of the terminal device, only the satellite can accurately calculate transmit power actually required by the ground terminal device and send the transmit power to the terminal device. In addition, only when update of transmit power information is kept throughout an entire satellite communication period, a high-quality and high-reliability satellite communication link can be ensured.

Figure 3:
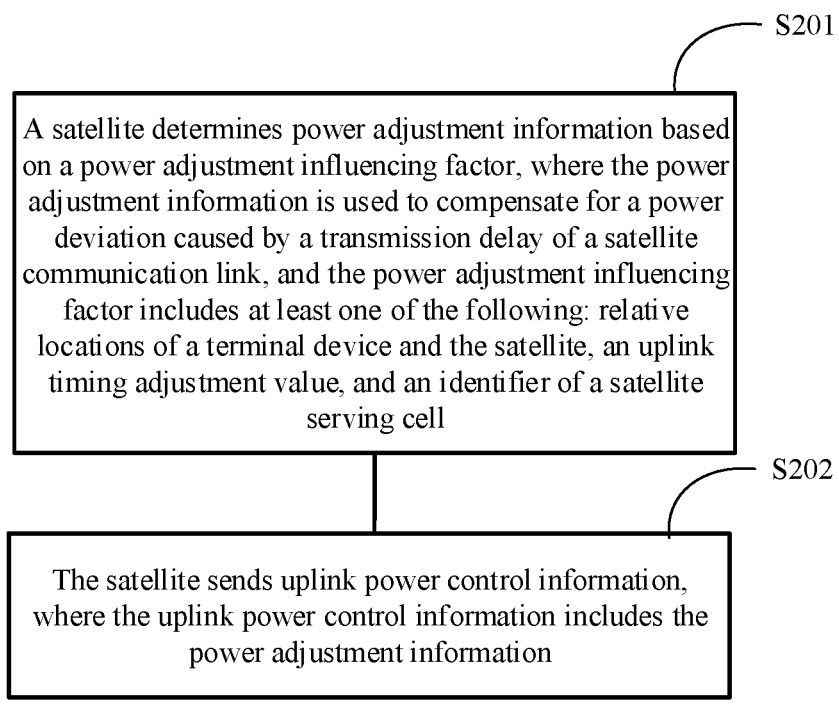
FIG. 3 is a flowchart of another uplink power control method according to an embodiment of this application.

FIG. 3 is a flowchart of another uplink power control method according to an embodiment of this application. The method is applicable to a satellite, and the method includes the following steps.

S201: The satellite determines power adjustment information based on a power adjustment influencing factor, where the power adjustment information is used to compensate for a power deviation caused by a transmission delay of a satellite communication link, and the power adjustment influencing factor includes at least one of the following: relative locations of a terminal device and the satellite, an uplink timing adjustment value, and an identifier of a satellite serving cell.

S202: The satellite sends uplink power control information, where the uplink power control information includes the power adjustment information.

Optionally, after the satellite sends the uplink power control information, the method further includes: The satellite sends updated uplink power control information based on time indicated by a timer; or the satellite monitors relative locations of the terminal device and the satellite, and sends updated uplink power control information if the relative locations of the terminal device and the satellite meet a preset threshold condition.

It may be understood that a method for determining uplink transmit power on a satellite side is also applicable to an optional feature on a terminal device side.

With reference to related content in the foregoing NR protocol, an embodiment of this application provides a method for determining uplink power control information, and the uplink power control information includes power adjustment information. A method for determining transmit power of a physical uplink shared channel (PUSCH) is used as an example for description below. A calculation formula for the transmit power of the physical uplink shared channel (PUSCH) is as follows:

$$P_{pusch,f,c}(i, j, q_d, l) = \min\left\{ \begin{array}{l} P_{CMAX,f,c}(i) \\ P_{O_{PUSCH},f,c}(j) + 10\log_{10}(2^u M_{RB,f,c}^{PUSCH}(i)) + \alpha_{f,c}(j)PL_{f,c}(q_d) + \Delta_{TF,f,c}(i) + f_{f,c}(i, l) + \Delta P \end{array} \right\} \quad (2.1)$$

f represents a used carrier frequency band, c represents a serving cell identifier, i represents a transmission cycle of the PUSCH, j represents a configured parameter, and l represents a power control adjustment status index.

$P_{CMAX,f,c}(i)$ (represents maximum power that the terminal device (UE) allows to transmit on a carrier and a serving cell.

$P_{O\_PUSCH\ f,c}(j)$ represents initial power (this parameter includes a cell-level higher layer configuration parameter and a UE-level higher layer configuration parameter) of the physical uplink shared channel (PUSCH).

$M_{RB,f,c}^{PUSCH}(i)$ represents resource allocation bandwidth indication information of the PUSCH.

$\alpha_{f,c}(j)=1$ represents a path loss compensation factor.

$PL_{f,c}(q_d)$ represents a path loss estimate.

$\Delta_{TF,f,c}(i)$ represents an offset of a modulation scheme, for example, $\Delta_{TF,f,c}(i)=10\ \log_{10}\ ((2^{BPRE\cdot K_s}-1)\cdot\beta_{offset}^{PUSCH})$, which is used to control power for transmitting information on the PUSCH.

$f_{f,c}(i, l)$ represents an adjustment parameter for closed-loop power control of the PUSCH.

$\Delta P$ represents a change rate of a transmit power adjustment value, and represents a change of power in a specific time range. A specific determining method is described later.

When the transmit power of the physical uplink shared channel (PUSCH) does not exceed maximum output power configured by the terminal device, the new parameter $\Delta P$ is introduced to correct an adjustment value deviation of the transmit power that is caused by a large transmission delay of the satellite communication link.

Optionally, when the transmit power of the physical uplink shared channel (PUSCH) does not exceed the maximum output power configured by the terminal device, each parameter in the calculation formula for the transmit power of the physical uplink shared channel (PUSCH) may be converted into a function of adjusting a transmit power change situation. For example, an adjustment parameter for the closed-loop power control of the PUSCH is $f_{f,c}(i, l)= f_{f,c}(i-1, l)+a\cdot\Delta P\cdot\Delta t+c$; in other words, the adjustment parameter $f_{f,c}(i, l)$ may be a linear function that is based on adjustment of a transmit power change rate, a and C represent coefficients used to determine the adjustment parameter $f_{f,c}(i, l)$, and $\Delta t$ represents a preset unit time length. It may be understood that, determining each parameter in the calculation formula for the transmit power of the physical uplink shared channel (PUSCH) based on a function is merely a determining form, and each parameter in the formula may alternatively be determined in a lookup table (lookup table) manner. For example, a table is looked up based on different transmit power change rates ΔP to obtain the adjustment parameter $f_{f,c}(i, l)$ for the closed-loop power control of the PUSCH. The determining form is used as an example in this application, but is not limited.

Optionally, when the transmit power of the physical uplink shared channel (PUSCH) does not exceed the maximum output power configured by the terminal device, in the calculation formula for determining the transmit power of the physical uplink shared channel (PUSCH), there can be the change rate ΔP of the transmit power adjustment value, and in addition, the adjustment parameter $f_{f,c}(i, l)$ for the closed-loop power control of the PUSCH is determined based on the change rate ΔP.

Optionally, in a specific embodiment, the calculation formula for the transmit power may still be determined based on a formula in the existing NR protocol, namely:

terminal device A on projection of an orbital plane of the satellite on the earth surface. A relationship between the terminal device A and the reference point A' may be represented by angles β and θ, where β is a plane included angle (that is, an included angle ∠COD between a plane OAA' and the orbital plane of the satellite), and θ is an orbital plane projection angle (that is, an included angle ∠AOA' between OA and OA') of the terminal A, or this angle parameter may be equivalently represented by an arc length $l_{AA'}=\theta r$. A geocentric angle between the satellite S and the reference point A' at a current moment t is represented by $\phi(t)=\omega t$, where ω presents an angular velocity of the satellite S relative to the reference point A', or this angle parameter may be equivalently represented by an arc length $l_{S'A'}=\phi(t)r$. S' (not shown in the figure) is an intersection point between a connection line of the satellite S and the earth's core O and the projection of the orbital plane of the satellite on the earth surface. The three pieces of angle information β, θ, Ø(t) or equivalent information of the three pieces of angle information are used to indicate relative locations of the terminal A $$P_{PUSCH,f,c}(i, j, q_d, l) = \min \left\{ \begin{array}{l} P_{CMAX,f,c}(i), \\ P_{O\_PUSCH,f,c}(j) + 10\log_{10}(2^\mu \cdot M^{PUSCH}_{RB,f,c}(i)) + \alpha_{f,c}(j) \cdot PL_{f,c}(q_d) + \Delta_{TF,f,c}(i) + f_{f,c}(i, l) \end{array} \right\} \quad (2.2)$$

However, the adjustment parameter $f_{f,c}(i, l)$ for the closed-loop power control of the PUSCH and the adjustment parameter for closed-loop power control in the foregoing protocol are determined in different manners. In this embodiment of this application, $f_{f,c}(i, l)=f_{f,c}(i-1, l)+\delta$, where δ represents an adjustment value of uplink transmit power in a preset time range (or unit time). Optionally, δ may be determined by using a formula δ=ΔQ·Δt. ΔQ represents a change rate of the adjusted transmit power, and indicates a change situation of the uplink transmit power in the specific time range, and Δt represents a preset unit time length. Specifically, ΔQ may be consistent with a definition of ΔP in this embodiment of this application, so that implementation solutions are unified, or a definition of ΔQ may be adjusted and changed based on a specific case. This is not limited in this application.

The change rate ΔP of the transmit power adjustment value is related to the relative locations of the terminal device and the satellite and a change trend. In this application, a method for determining the relative locations of the terminal device and the satellite and the change trend is provided by way of example. It may be understood that the determining method is not unique, and may be adaptively adjusted based on a change of a known condition with reference to the method in this application.

Figure 4:
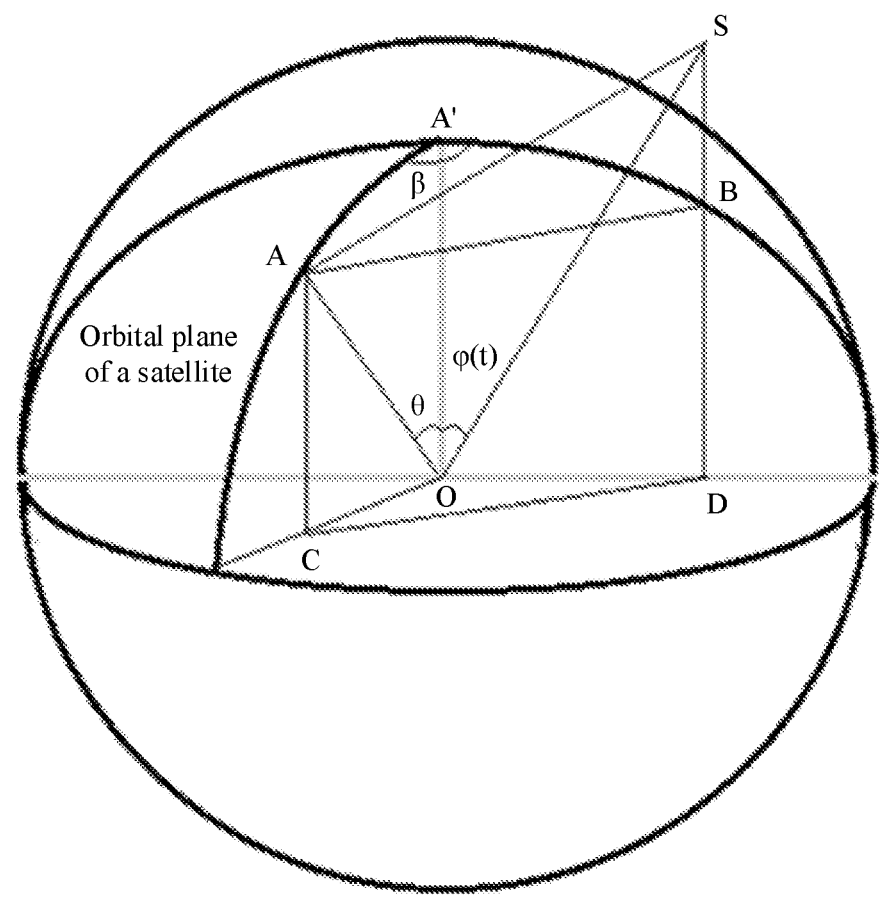
FIG. 4 is a schematic diagram of relative locations of a terminal device and a satellite.

FIG. 4 is a schematic diagram of relative locations of a terminal device and a satellite. In the figure, a terminal device A may calculate a power adjustment change rate ΔP based on a location of the terminal device A and relative location information between the terminal device A and the satellite. An orbital plane of the satellite is marked in FIG. 4, O represents the earth's core, S represents a communication satellite that runs on the orbit surface of the satellite shown in the figure, it may be considered that a running orbit of the communication satellite is a circular orbit, R is a distance (OS) between the earth's core and an orbit of the satellite, r is a radius (OA) of the earth, A is a location of a terminal device on an earth surface, a manually determined reference point A' is introduced, and A' is a point of the and the satellite S. C and D are projection of the terminal device A and the satellite S on a plane perpendicular to the orbital plane of the satellite, respectively.

Based on known conditions, there are:

$$AC = r\cos\theta, OC = r\sin\theta \quad (3.1)$$

$$SD = R\cos\phi(t), OD = R\sin\phi(t) \quad (3.2)$$

Because ΔSAB is a right triangle, there are:

$$SA^A = AB^2 + SB^2 \quad (3.3)$$

$$\begin{aligned} AB^2 &= CD^2 \\ &= OC^2 + OD^2 - 2OC \cdot OD\cos\angle COD \\ &= r^2\sin^2\theta + R^2\sin^2\phi(t) - 2Rr\sin\theta\sin\phi(t)\cos\beta \end{aligned} \quad (3.4)$$

$$\begin{aligned} SB^2 &= (SD - BD)^2 \\ &= (SD - AC)^2 \\ &= (R\cos\phi(t) - r\cos\theta)^2 \end{aligned} \quad (3.5)$$

$$\Rightarrow SA^2 = R^2 + r^2 - 2Rr[\sin\theta\cos\beta\sin\phi(t) + \cos\theta\cos\phi(t)], \quad (3.6)$$

$$\phi(t) = \omega t$$

$$\Rightarrow l(t) = SA = \sqrt{R^2 + r^2 - 2Rr[\sin\theta\cos\beta\sin(\omega t) + \cos\theta\cos(\omega t)]} \quad (3.7)$$

$$\Rightarrow l(t)' = \frac{-\omega rR[\sin\theta\cos\beta\cos(\omega t) - \cos\theta\sin(\omega t)]}{\sqrt{R^2 + r^2 - 2Rr[\sin\theta\cos\beta\sin(\omega t) + \cos\theta\cos(\omega t)]}} \quad (3.8)$$

l(t)' represents a change rate of a distance between the terminal device A and the satellite S. Because a path loss of a satellite link is related to the distance, and a transmission delay is also related to the distance, a change rate of a transmit power adjustment value may be determined based on the change rate of the distance between the terminal and the satellite. Optionally and specifically, ΔP=b·l(t)'+c, where b and c are coefficients for determining the change rate ΔP of the transmit power adjustment value. Optionally, b and c may be constants, and may be determined based on information such as a capability of the terminal device, a type of the satellite, and a feature of a geographical location of the terminal device. It may be understood that determining the change rate ΔP of the transmit power adjustment value based on a function is merely a determining form, and the change rate ΔP of the transmit power adjustment value may alternatively be determined in a lookup table (lookup table) manner. For example, a table is looked up based on change rates l(t)' of distances between the satellite and different terminals, to obtain the change rate ΔP of the transmit power adjustment value. The determining form is used as an example in this application, but is not limited.

In addition to the foregoing method for determining the change rate ΔP of the transmit power adjustment value, another counter that reflects the distance between the terminal device and the communication satellite may be used for representation; in other words, ΔP=d·∈(t)+e, where ∈(t) represents a counter that can reflect the distance between the terminal device and the communication satellite, or a combination of counters that can reflect the distance between the terminal device and the communication satellite, and d and e may be constants. For a specific determining manner, refer to the foregoing example. For example, the change rate ΔP may be bound to the uplink timing adjustment value; in other words, the satellite delivers an indication based on an uplink timing offset. Optionally, timing advance (TA) adjustment is also positively related to the distance between the terminal device and the communication satellite. A larger distance leads to a larger TA and a larger change rate of the distance between the terminal and the satellite, and correspondingly leads to a larger change rate of the TA. Therefore, the change rate of the TA adjustment may be introduced to indicate the change rate ΔP of the transmit power adjustment value, and the change rate ΔP of the transmit power adjustment value may be determined by using a mapping operation such as a function and table lookup.

How to determine the uplink transmit power of the terminal device is one of the keys for establishing high-quality communication with the satellite. Another key is how to notify the ground terminal device to adjust the power. A corresponding method is provided in this application with reference to a specific embodiment.

Before a notification method is given, change rates ΔP of the power adjustment can be classified as follows:

Case 1: When the change rate ΔP of the power adjustment is UE-specific, in other words, power adjustment change rates ΔP of different terminal devices in a cell need to be differentiated, the satellite may notify the terminal device of a required uplink power control parameter by using information carried on a control channel, where the uplink power control parameter includes the power adjustment change rate ΔP.

1. The satellite may deliver one piece of downlink control information (DCI) to the ground terminal device, where the DCI includes at least one indication index (index), the index corresponds to an entry, content of the entry is agreed upon by a terminal side and a network side in advance, or content of the entry is learned by the terminal side in another manner, and the entry indicates an uplink power control parameter, where the uplink power control parameter includes the power adjustment change rate ΔP. The power adjustment change rate and/or an equivalent coefficient of the power adjustment change rate in the solution of this application are/is merely schematically listed in the following tables, and similarly, another coefficient in the calculation formula for determining the transmit power may be learned from the entry and is not listed in the following tables.

TABLE 1

Table of power adjustment change rate

| Index | 1 | 2 | 3 | ... | n |
|---|---|---|---|---|---|
| Coefficient | ΔP1 | ΔP2 | ΔP3 | | ΔPn |

TABLE 2

Table of power adjustment change rate and/or equivalent coefficient of the power adjustment change rate

| Index | 1 | 2 | 3 | ... | n |
|---|---|---|---|---|---|
| Coefficient 1 | ΔP1 | ΔP2 | ΔP3 | | ΔPn |
| Coefficient 2 | ΔQ1(δ1) | ΔQ2(δ2) | ΔQ3(δ3) | | ΔQn(δn) |

It should be noted that, ΔPi, ΔQi, and δi in the tables are preset constants, and i={1, 2, 3, . . . , n}. For example, ΔPi is ½, ⅓, 7/16, 8/7, 0.25, 1.3, or 10.

2. The satellite may deliver one piece of downlink control information (DCI) to the ground terminal device, where the DCI includes at least one group of parameters for controlling the uplink transmit power, and the parameter includes the power adjustment change rate ΔP and/or an equivalent power change amount of the power adjustment change rate ΔP, for example, the foregoing adjustment parameter $f_{f,c}$ (i for the closed-loop power control of the PUSCH in the calculation formula for the transmit power that is the same as that in the NR protocol and/or the uplink transmit power adjustment value δ in the preset time range (or unit time). A quantity of parameters in the group of parameters for controlling the uplink transmit power should be determined based on a specific scenario and an application condition. It may be understood that a group of parameters may include only at least one parameter.

For example, the DCI indicates a group of parameters for controlling the uplink transmit power. The group of parameters include only the power adjustment change rate ΔP with a value of 1.3. For another example, the DCI indicates a group of parameters for controlling the uplink transmit power. The group of parameters include only the power adjustment change rate ΔP and equivalent counters ΔQ and δ of the power adjustment change rate ΔP.

3. The satellite may deliver one piece of downlink control information (DCI) to the ground terminal device, where the DCI includes an updated value relative to a previous adjustment value, and a current adjustment value is obtained after accumulation. Specifically, an updated value indicated in the current DCI information may be added to the previous adjustment value. The adjustment value may be the power adjustment change rate ΔP, and the updated value is ω; and in this case, ΔP(i)=ΔP(i−1)+ω. Alternatively, the adjustment value may be the adjustment parameter $f_{f,c}$ (i for the closed-loop power control of the PUSCH, and the updated value is δ; and in this case, $f_{f,c}(i, 1)=f_{f,c}(i-1, 1)+δ$. Alternatively, the adjustment value is another equivalent form of the power adjustment change rate ΔP or a combination thereof.

Case 2: When the power adjustment change rate ΔP is cell-specific, in other words, power adjustment change rates of serving terminal devices in a same serving cell do not need to be differentiated. Optionally, all terminal devices in the same cell may maintain a same power adjustment change rate, and different cells maintain different power adjustment change rates. Optionally, one satellite beam may correspond to one power adjustment change rate (power adjustment value), and power adjustment change rates of terminal devices in one satellite beam are not differentiated. When determining that a terminal device is located in a beam cell, the satellite sends a corresponding adjustment value. The satellite may notify the terminal through broadcasting, for example, the satellite delivers RRC signaling to the ground terminal device, and the RRC signaling includes the power adjustment change rate ΔP.

1. The satellite may broadcast one piece of RRC signaling to a ground serving cell, where the RRC signaling includes at least one indication index (index), the index corresponds to an entry, content of the entry is agreed upon by a terminal side and a network side in advance, or content of the entry is learned by the terminal side in another manner, and the entry indicates an uplink power control parameter, where the uplink power control parameter includes the power adjustment change rate ΔP. For a specific form, refer to the embodiment in which the DCI includes the indication index.

2. The satellite may broadcast one piece of RRC signaling to a ground serving cell, where the RRC signaling includes at least one group of parameters for controlling the uplink transmit power, and the parameter includes the power adjustment change rate ΔP and/or an equivalent power change amount of the power adjustment change rate $f_{f,c}(i,l)$, for example, the foregoing adjustment parameter δ for the closed-loop power control of the PUSCH in the calculation formula for the transmit power that is the same as that in the NR protocol and/or the uplink transmit power adjustment value ΔP in the preset time range (or unit time). A quantity of parameters in the group of parameters for controlling the uplink transmit power should be determined based on a specific scenario and an application condition. It may be understood that a group of parameters may include only at least one parameter. For details, refer to the embodiment in which the DCI includes a group of parameters.

3. The satellite may broadcast one piece of RRC signaling to a ground serving cell, where the RRC signaling includes an updated value relative to a previous adjustment value, and a current adjustment value is obtained after accumulation. Specifically, an updated value indicated in the current DCI information may be added to the previous adjustment value. For this form, refer to the embodiment in which the DCI includes the updated value.

After a method for determining the uplink transmit power and a method for sending the uplink transmit power are provided, this application file further provides an occasion for sending a control parameter related to the uplink transmit power. Because the satellite moves at a high speed relative to the earth surface, to ensure timely and accurate delivery of the power adjustment value of the terminal device, the satellite needs to update the power adjustment value of the terminal device such as the change rate of the transmit power adjustment value as required.

Figure 5:
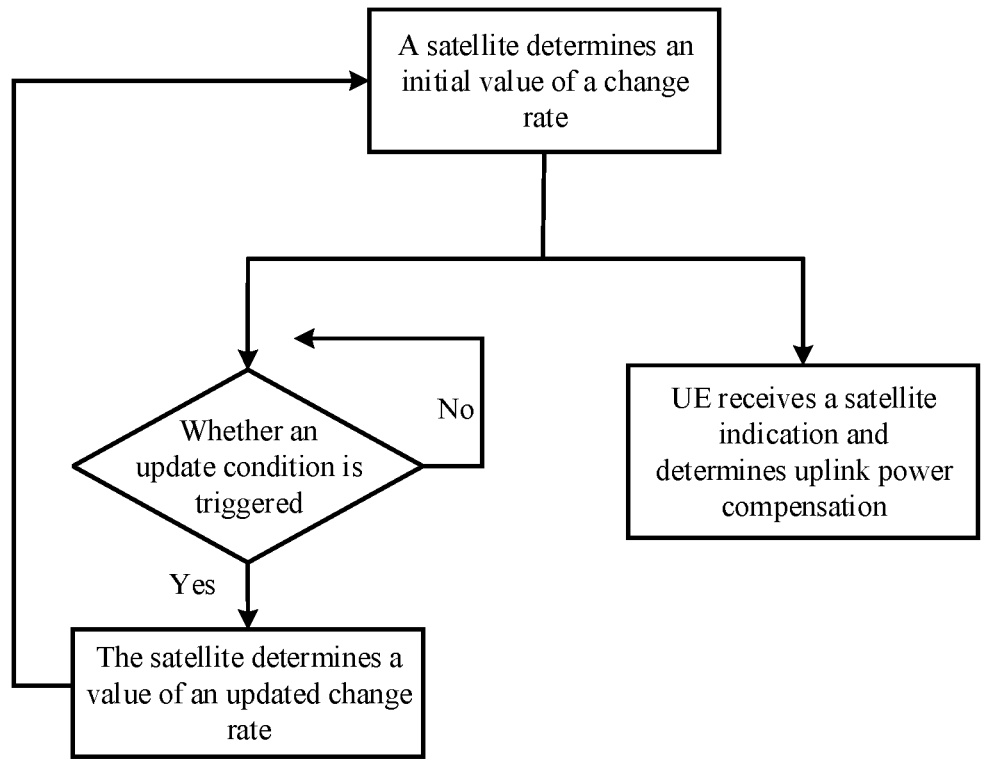
FIG. 5 shows a method for updating a change rate ΔP of a transmit power adjustment value based on a trigger condition according to an embodiment of this application.

The change rate ΔP of the transmit power adjustment value is used as an example for description. FIG. 5 shows a method for updating the change rate ΔP of the transmit power adjustment value based on a trigger condition. The satellite first determines an initial value of the change rate and delivers the value to the terminal device. Then, the satellite monitors whether a preset trigger condition is triggered. If the trigger condition is not triggered, the satellite continues to perform monitoring. If the trigger condition is triggered, the satellite determines a value of an updated change rate and delivers the value of the updated change rate to the terminal device, so that a new cycle is started by using the updated change rate as a new initial value of the change rate. The terminal device accepts this indication to determine an uplink power compensation value. For the trigger condition, refer to the following method:

1. After previous ΔP is delivered by the satellite, the satellite immediately starts timing. Specifically, the satellite may start a timer 1. After the timer 1 expires, the satellite immediately updates a ΔP value based on information such as new relative locations and sends the updated ΔP value to the ground terminal device, and resets the timer 1 at the same time to start a new round of timing. Cycles are performed in order.

2. In addition to updating the ΔP according to time, the satellite monitors a relative location relationship between the terminal device and the satellite at a current moment based on a preset condition. When the relative location relationship between the terminal device and the satellite meets a trigger threshold, the satellite updates a ΔP value and delivers the updated ΔP value to the ground terminal device. Optionally, the trigger threshold is a preset distance value.

With reference to related content in the foregoing NR protocol, an embodiment of this application further provides a method for determining uplink power control information, and the uplink power control information includes power adjustment information. A method for determining transmit power of a physical uplink shared channel (PUSCH) is used as an example for description below. A calculation formula for the transmit power of the physical uplink shared channel (PUSCH) is as follows:

$$P_{pusch,f,c}(i, j, q_d, l) = \min\left\{ \begin{array}{c} P_{CMAX,f,c}(i) \\ P_{O_{PUSCH},f,c}(j) + 10\log_{10}(2^u M_{RB,f,c}^{PUSCH}(i)) + \Delta\alpha_{f,c}(j)PL_{f,c}(q_d) + \Delta_{TF,f,c}(i) + f_{f,c}(i, l) \end{array} \right\} \quad (4.1)$$

f represents a used carrier frequency band, c represents a serving cell identifier, i represents a transmission cycle of the PUSCH, j represents a configured parameter, and l represents a power control adjustment status index.

$P_{CMAX,f,c}(i)$ represents maximum power that the terminal device (UE) allows to transmit on a carrier and a serving cell.

$P_{O\_PUSCH,f,c}(j)$ represents initial power (this parameter includes a cell-level higher layer configuration parameter and a UE-level higher layer configuration parameter) of the physical uplink shared channel (PUSCH).

$M_{RB,f,c}^{PUSCH}(i)$ represents resource allocation bandwidth indication information of the PUSCH.

$\Delta\alpha_{f,c}(j)$ represents a path loss compensation factor, and the path loss compensation factor is different from $\Delta\alpha_{f,c}(j)$ in an existing protocol. $\Delta\alpha_{f,c}(j)$ in this embodiment of this application is a variable constant, and this value is indicated by the satellite by using a message or signaling or is determined by the terminal device.

$PL_{f,c}(q_d)$ represents a path loss estimate.

$\Delta_{TF,f,c}(i)$ represents an offset of a modulation scheme, for example, $\Delta_{TF,f,c}(i)=10 \log_{10}((2^{BPRE\cdot K_s})\cdot\beta_{offset}^{PUSCH})$, which is used to control power for transmitting information on the PUSCH.

$f_{f,c}(i, 1)$ represents an adjustment parameter for closed-loop power control of the PUSCH.

For a method for determining and a manner of indicating the path loss compensation factor $\Delta\alpha_{f,c}(j)$, refer to a manner of determining and indicating the change rate $\Delta P$ of the transmit power adjustment value. When the transmit power of the physical uplink shared channel (PUSCH) does not exceed maximum output power configured by the terminal device, an adjustment value deviation of transmit power caused by a large transmission delay of a satellite communication link is corrected by expanding a value range of the path loss compensation factor.

Optionally, the satellite may deliver an index of the path loss compensation factor, and the index corresponds to a value of one or more path loss compensation factors. For details, refer to a table of a path loss compensation factor shown in Table 3, where $\Delta\alpha_n$ may be any constant.

TABLE 3

Table of path loss compensation factor

| Index | 1 | 2 | ... | 3 | ... | 4 | ... | n |
|---|---|---|---|---|---|---|---|---|
| $\Delta\alpha_{f,c}(j)$ | 0 | 0.1 | ... | 0.5 | ... | 1 | ... | $\Delta\alpha_n$ |

Optionally, the satellite may alternatively determine the path loss compensation factor based on a calculation formula, and then deliver the information. Specifically, the calculation formula is $\Delta\alpha_{f,c}(j)=d\cdot\in'+e$, where $d\cdot\in'$ represents a main function that can reflect a path loss of a satellite link, and e represents a correction compensation amount whose value may be 0.

Similar to that the satellite notifies the ground terminal device to adjust power in the foregoing descriptions, the satellite may deliver, on an appropriate occasion, the path loss compensation factor required by the terminal device (UE). For a specific delivery method, refer to the manner of notifying the power adjustment change rate $\Delta P$. For selection of a specific sending occasion, also refer to the foregoing method for updating the change rate $\Delta P$ of the transmit power adjustment value based on the trigger condition.

Figure 6:
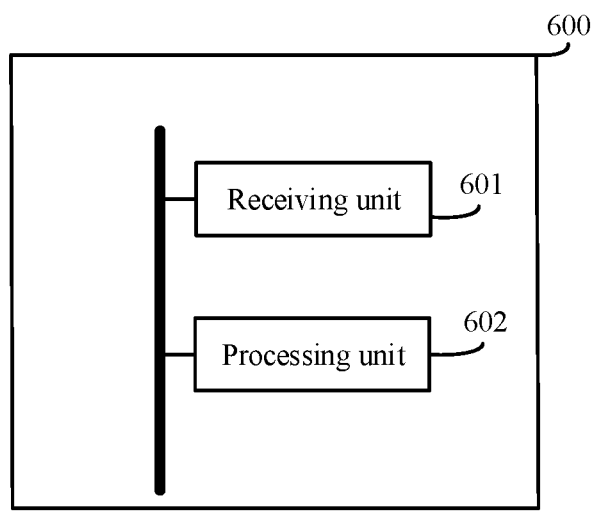
FIG. 6 shows a satellite communication apparatus 600 according to an embodiment of this application.

FIG. 6 shows a satellite communication apparatus 600 according to an embodiment of this application. The apparatus 600 may be a terminal device used for satellite communication, or may be a communication chip, a communication component, or a communication system in the terminal device. The apparatus 600 may be configured to perform the foregoing related power control method and specific embodiments. As shown in FIG. 6, the apparatus 600 includes a receiving unit 601 and a processing unit 602.

The receiving unit 601 is configured to receive uplink power control information, where the uplink power control information includes power adjustment information, and the power adjustment information is used to compensate for a power deviation caused by a transmission delay of a satellite communication link.

The processing unit 602 is configured to: determine uplink transmit power based on the uplink power control information, and send an uplink signal based on the uplink transmit power.

The uplink power control method has been described in the foregoing specific embodiment. The apparatus 600 is merely configured to perform the power control method based on a program. Therefore, specific descriptions of the uplink power control method are involved. Specifically, for the power adjustment information received by the receiving unit 601, refer to the method corresponding to FIG. 2 and a related part in a specific embodiment. Details are not described herein again.

Figure 7:
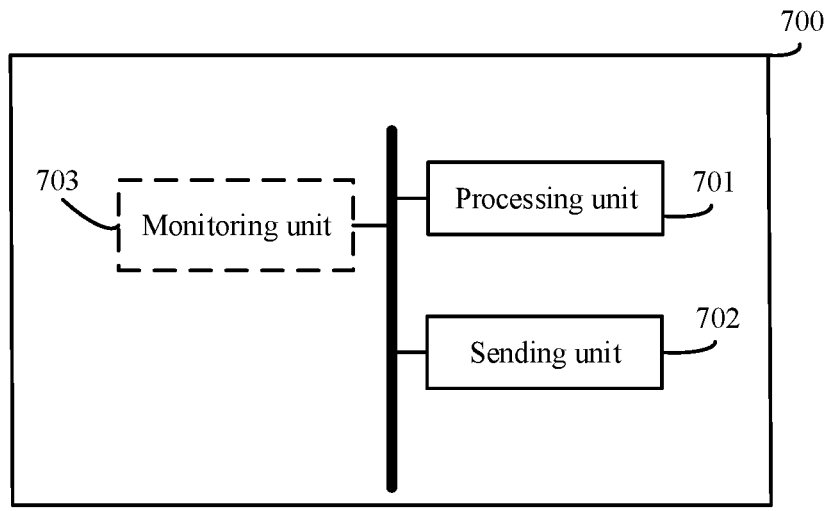
FIG. 7 shows a satellite communication apparatus 700 according to an embodiment of this application.

FIG. 7 shows a satellite communication apparatus 700 according to an embodiment of this application. The apparatus 700 may be a satellite used for satellite communication, or may be a communication chip, a communication component, or a communication system in the satellite. The apparatus 700 may be configured to perform the foregoing related power control method and specific embodiments. As shown in FIG. 7, the apparatus 700 includes a processing unit 701 and a sending unit 702.

The processing unit 701 is configured to determine power adjustment information based on a power adjustment influencing factor, where the power adjustment information is used to compensate for a power deviation caused by a transmission delay of a satellite communication link, and the power adjustment influencing factor includes at least one of the following: relative locations of a terminal device and the satellite, an uplink timing adjustment value, and an identifier of a satellite serving cell.

The sending unit 702 is configured to send uplink power control information, where the uplink power control information includes the power adjustment information.

Optionally, the apparatus 700 further includes: a monitoring unit 703, configured to monitor time indicated by a timer, so that the satellite communication apparatus 700 sends updated uplink power control information; or configured to: monitor the relative locations of the terminal device and the satellite, and enable the satellite communication apparatus 700 to send updated uplink power control information if the relative locations of the terminal device and the satellite meet a preset threshold condition.

For the power adjustment information, refer to the method corresponding to FIG. 2 and a related part in a specific embodiment. Details are not described herein again.

Figure 8:
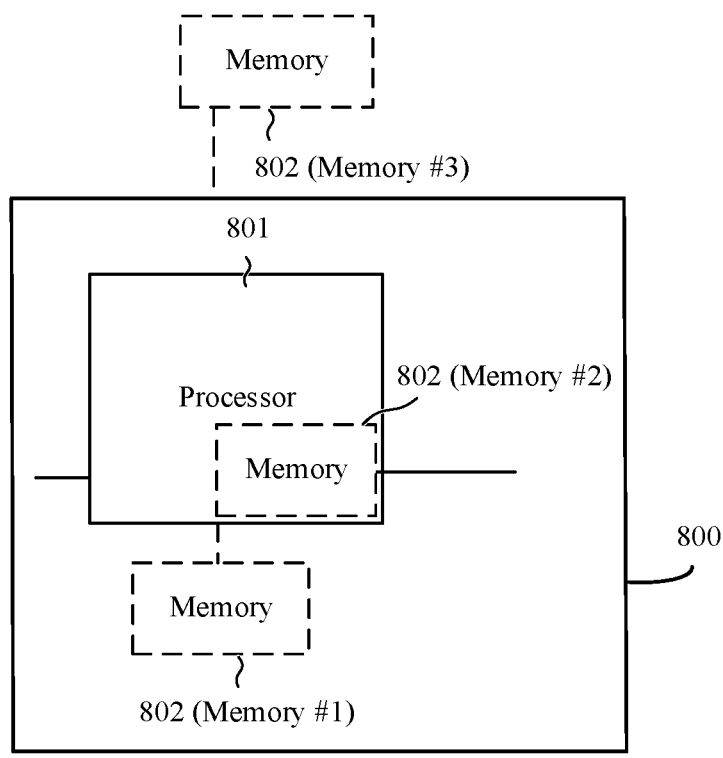
FIG. 8 shows a communication apparatus 800 according to an embodiment of this application.

FIG. 8 shows a communication apparatus 800 according to an embodiment of this application. The communication apparatus 800 may be configured to perform the foregoing uplink power control method and specific embodiments performed by the foregoing terminal device. As shown in FIG. 8, the apparatus 800 includes a processor 801 and a memory 802.

The memory 802 is electrically coupled to the processor 801, the memory 802 is configured to store computer-readable instructions or a computer program, and the processor 801 is configured to read the computer-readable instructions or the computer program to implement the uplink power control method performed by the terminal device and a related part in a specific embodiment.

Optionally, the memory 802 (Memory #1) may be independent of the processor 801 or the communication apparatus 800 (Memory #3), or may be integrated into the processor 801 (Memory #2).

Figure 9:
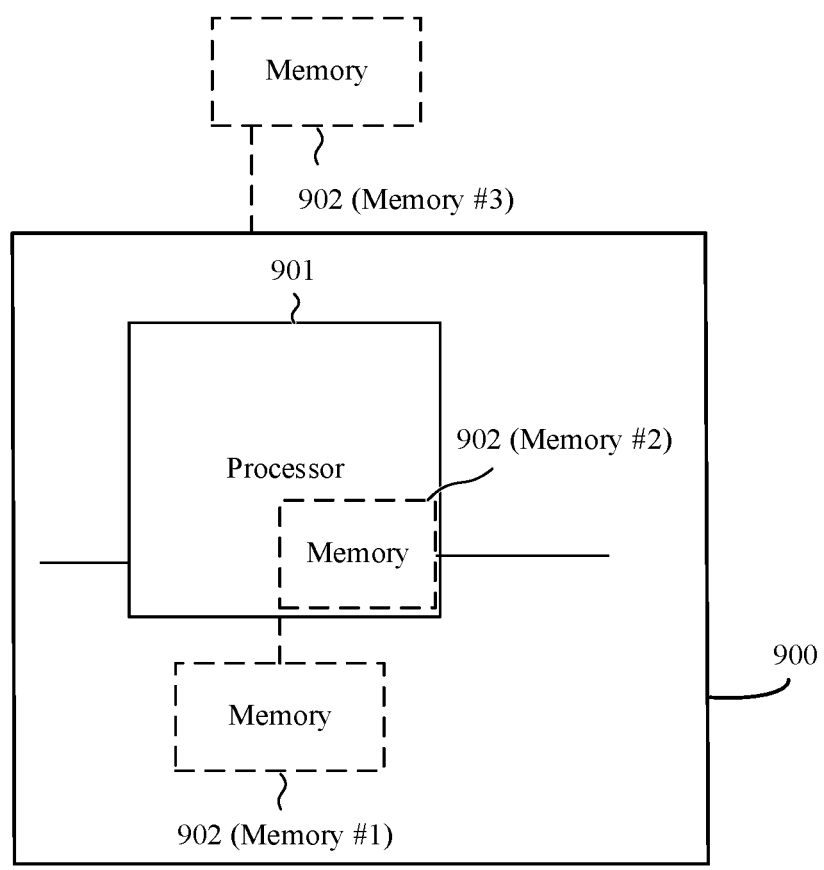
FIG. 9 shows a communication apparatus 900 according to an embodiment of this application.

FIG. 9 shows a communication apparatus 900 according to an embodiment of this application. The communication apparatus 900 may be configured to perform the foregoing uplink power control method and specific embodiments performed by the foregoing satellite side. As shown in FIG. 9, the apparatus 900 includes a processor 901 and a memory 902.

The memory 902 is electrically coupled to the processor 901, the memory 902 is configured to store computer-readable instructions or a computer program, and the processor 901 is configured to read the computer-readable instructions or the computer program to implement the uplink power control method performed by the satellite and a related part in a specific embodiment.

Optionally, the memory 902 (Memory #1) may be independent of the processor 901 or the communication apparatus 900 (Memory #3), or may be integrated into the processor 901 (Memory #2).

An embodiment of this application further provides a computer-readable medium. The computer-readable medium stores computer program instructions, and when the computer program instructions are executed by a computer, the method in any one of the foregoing embodiments is implemented.

An embodiment of this application further provides a computer program product. When the computer program product is executed by a computer, the method in any one of the foregoing embodiments is implemented.

An embodiment of this application further provides a computer program. When the computer program product is executed by a computer, the method in any one of the foregoing embodiments is implemented.

In the examples described in the embodiments of this application, units and method processes can be implemented by electronic hardware or a combination of computer software and electronic hardware. Whether the functions are performed by hardware or software depends on particular applications and design constraints of the technical solutions. A person skilled in the art may use different methods to implement the described functions for each specific application.

In the several embodiments provided in this application, it should be understood that the disclosed apparatus and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware combined with a software function unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application.

What is claimed is:

1. An uplink power control method, wherein the method comprises:
   receiving, by a terminal device, uplink power control information, wherein the uplink power control information comprises power adjustment information, and the power adjustment information is used to compensate for a power deviation caused by a transmission delay of a satellite communication link;
   determining, by the terminal device, uplink transmit power based on the uplink power control information; and
   sending an uplink signal based on the uplink transmit power.

2. The method according to claim 1, wherein the power adjustment information is determined based on at least one of relative locations of the terminal device and a satellite, an uplink timing adjustment value, or an identifier of a satellite serving cell.

3. An uplink power control method, wherein the method comprises:
   determining, by a satellite, power adjustment information based on a power adjustment influencing factor, wherein the power adjustment information is used to compensate for a power deviation caused by a transmission delay of a satellite communication link, and the power adjustment influencing factor comprises at least one of relative locations of a terminal device and the satellite, an uplink timing adjustment value, or an identifier of a satellite serving cell; and
   sending, by the satellite, uplink power control information, wherein the uplink power control information comprises the power adjustment information.

4. The method according to claim 3, wherein after sending, by the satellite, the uplink power control information, the method further comprises:
   sending, by the satellite, updated uplink power control information based on time indicated by a timer; or
   monitoring, by the satellite, the relative locations of the terminal device and the satellite, and sending updated uplink power control information in response to the relative locations of the terminal device and the satellite meeting a preset threshold condition.

5. The method according to claim 1, wherein the power adjustment information comprises at least one of the following:
   a power adjustment change rate, wherein the power adjustment change rate is used to determine a change rate of compensation power in a preset time interval; or
   a power compensation factor, wherein the power compensation factor is a variable coefficient used to compensate for the power deviation caused by the transmission delay of the satellite communication link.

6. The method according to claim 5, wherein the power adjustment information comprises a first indication index, and the first indication index is used to indicate at least one of the power adjustment change rate or the power compensation factor.

7. The method according to claim 5, wherein the power adjustment information comprises a power adjustment update factor, and the terminal device updates at least one of the power adjustment change rate or the power compensation factor based on historical power adjustment information and the power adjustment update factor.

8. The method according to claim 5, wherein the power adjustment change rate is determined based on a change rate of a distance between the terminal device and a satellite.

9. A satellite communication apparatus, wherein the apparatus comprises:
a receiver;
at least one processor; and
one or more memories coupled to the at least one processor and storing programming instructions for execution by the at least one processor to:
receive, through the receiver, uplink power control information, wherein the uplink power control information comprises power adjustment information, and the power adjustment information is used to compensate for a power deviation caused by a transmission delay of a satellite communication link;
determine uplink transmit power based on the uplink power control information; and
send an uplink signal based on the uplink transmit power.

10. The apparatus according to claim 9, wherein the power adjustment information is determined based on at least one of relative locations of the apparatus and a satellite, an uplink timing adjustment value, or an identifier of a satellite serving cell.

11. The method according to claim 3, wherein the power adjustment information comprises at least one of the following:
a power adjustment change rate, wherein the power adjustment change rate is used to determine a change rate of compensation power in a preset time interval; or
a power compensation factor, wherein the power compensation factor is a variable coefficient used to compensate for the power deviation caused by the transmission delay of the satellite communication link.

12. The method according to claim 11, wherein the power adjustment information comprises a first indication index, and the first indication index is used to indicate at least one of the power adjustment change rate or the power compensation factor.

13. The method according to claim 11, wherein the power adjustment information comprises a power adjustment update factor, and the terminal device updates at least one of the power adjustment change rate or the power compensation factor based on historical power adjustment information and the power adjustment update factor.

14. The method according to claim 11, wherein the power adjustment change rate is determined based on a change rate of a distance between the terminal device and the satellite.

15. The apparatus according to claim 9, wherein the power adjustment information comprises at least one of the following:
a power adjustment change rate, wherein the power adjustment change rate is used to determine a change rate of compensation power in a preset time interval; or
a power compensation factor, wherein the power compensation factor is a variable coefficient used to compensate for the power deviation caused by the transmission delay of the satellite communication link.

16. The apparatus according to claim 15, wherein the power adjustment information comprises a first indication index, and the first indication index is used to indicate at least one of the power adjustment change rate or the power compensation factor.

17. The apparatus according to claim 15, wherein the power adjustment information comprises a power adjustment update factor, and the apparatus updates at least one of the power adjustment change rate or the power compensation factor based on historical power adjustment information and the power adjustment update factor.

18. The apparatus according to claim 15, wherein the power adjustment change rate is determined based on a change rate of a distance between the apparatus and a satellite.

* * * * *